Oct. 16, 1934.  C. S. McCHESNEY  1,976,740
APPARATUS FOR MAKING INFLATED ARTICLES
Filed Dec. 29, 1931  3 Sheets-Sheet 1
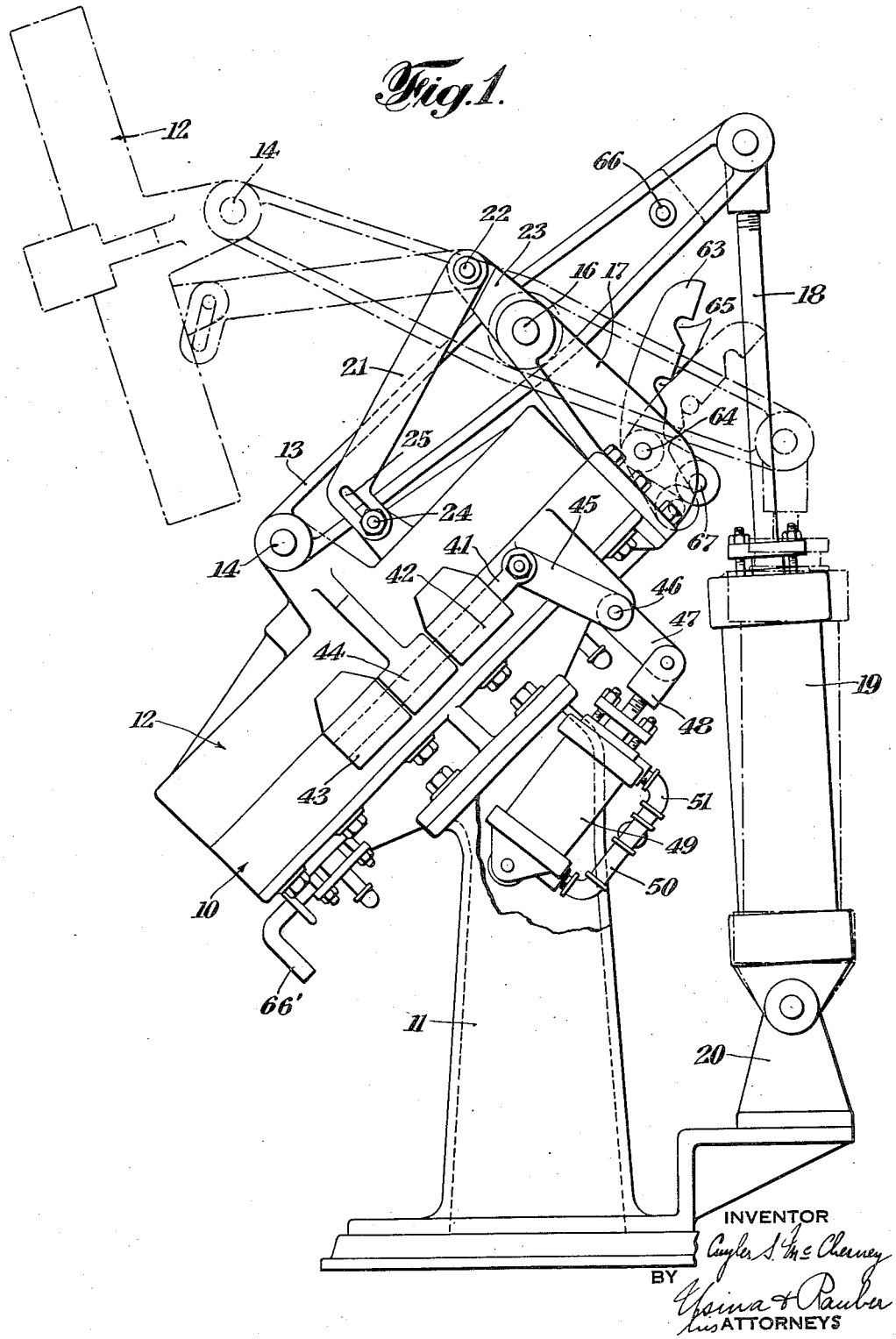

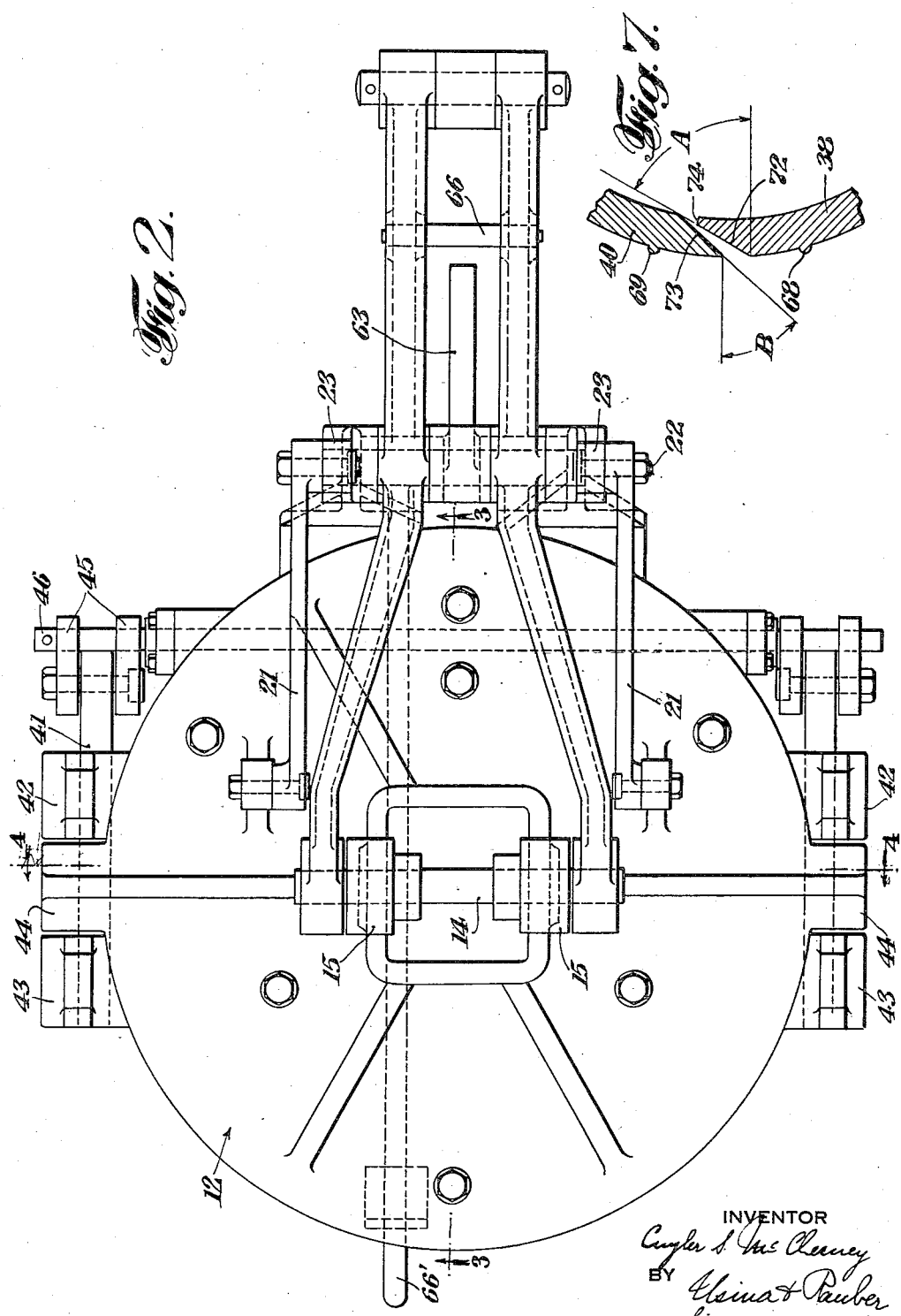

Oct. 16, 1934.  C. S. McCHESNEY  1,976,740
APPARATUS FOR MAKING INFLATED ARTICLES
Filed Dec. 29, 1931   3 Sheets-Sheet 3
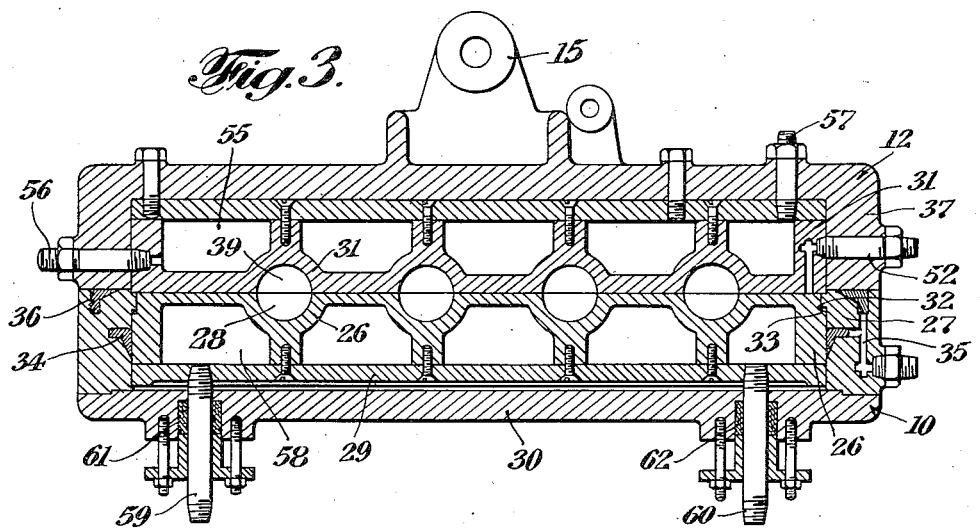
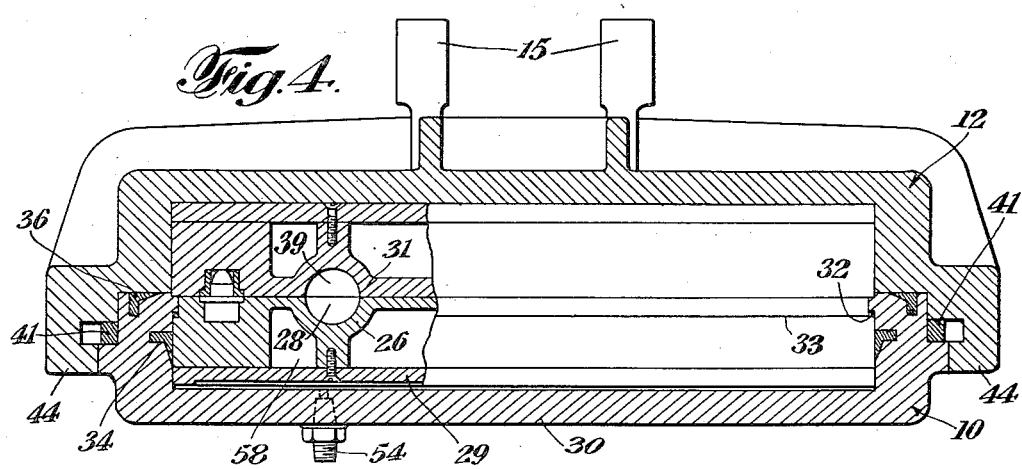
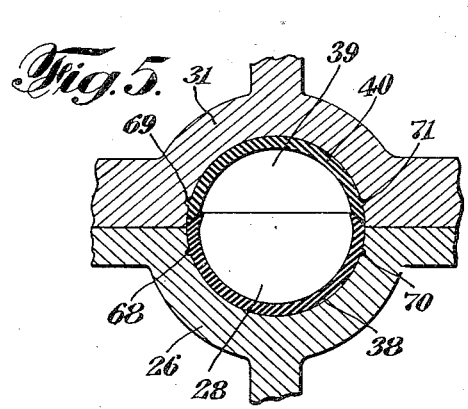
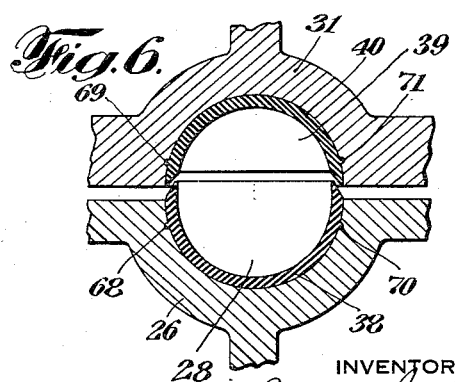

Patented Oct. 16, 1934

1,976,740

UNITED STATES PATENT OFFICE

1,976,740

APPARATUS FOR MAKING INFLATED ARTICLES

Cuyler S. McChesney, Kenmore, N. Y., assignor to Dunlop Tire and Rubber Corporation, Buffalo, N. Y., a corporation of New York Application December 29, 1931, Serial No. 583,640

16 Claims. (Cl. 18—19)

My invention relates to the manufacture of inflated articles such as tennis or other balls, the interior space of which is filled with a gas under a pressure. It relates to constructions enabling a more perfect sealing of the walls of the article to be obtained and provides means for effectively forming and filling the article with gas under pressure in an inexpensive simple manner.

Inflated balls and similar articles have heretofore been filled with gas under pressure by inserting a hollow needle into the ball through which the gas under pressure is supplied and then sealing the wall of the ball, or in placing within the ball a material that decomposes to a gas during the curing or vulcanization. Each of these methods has certain disadvantages. The balls may also be filled with gas under pressure when formed of two halves by joining these halves in an atmosphere of gas under pressure, and then curing. This latter method, however, is difficult and troublesome to carry out and is usually wasteful of gas.

The objects of my invention are to avoid the objections and disadvantages in the previous methods of forming and inflating hollow articles, and to provide an apparatus in which the balls or other articles may be formed of halves or parts while the inner spaces of said parts are filled with any desired gas under pressure, and in which the parts or halves are then joined substantially without the use of gas other than that supplied to said interior spaces; and further, to provide apparatus in which the parts to be joined may be easily and readily placed in position for joining and may be held properly positioned in the apparatus during the joining of the parts.

Another object of the invention is to provide a simple, compact apparatus for accomplishing these various purposes.

A further object of the invention is to provide article parts or halves suitably shaped readily to form a seal of the greatest tightness against escape of gas and to be easily placed and held in proper position in apparatus of the above type, and to form a finished ball or hollow article having a more perfect seal where the various parts of which the ball or article is formed are joined.

With these and other objects in view which will more fully appear from the following description, the invention resides in the article, apparatus and methods described and pointed out in the following specification and claims.

The various features are illustrated in the accompanying drawings, in which—

Fig. 1 is a view in side elevation of an apparatus embodying a preferred form of the invention, the various elements being shown in full lines in the position they occupy when the molds are closed, and being shown in broken lines in open mold position.

Fig. 2 is a top plan view of the apparatus shown in Fig. 1, certain supporting parts being omitted for clearness.

Fig. 3 is a sectional view of the molds and holding parts or retainers thereof taken on line 3—3 of Fig. 2.

Fig. 4 is a section partly on line 4—4 of Fig. 2, the mold parts being shown partly in section and partly in side elevation.

Figs. 5 and 6 are detail sectional views of a portion of a mold and of a ball positioned therein shown respectively in closed and slightly opened positions.

Fig. 7 is a detail sectional view on a somewhat enlarged scale of two halves or parts of an article about to be joined.

In my invention a pair of molding elements or mold halves containing recesses to form one or more articles are mounted in corresponding retainers or retainer shells in an apparatus whereby these retainers and the mold halves or elements may be brought into complementary closed relationship so that the retainer parts or shells form a completed chamber. One of the mold parts is movable within its respective retainer or shell to leave a slight space between its face and the opposed face of the other mold part and is sealed against the sides of the retainer or shell so that this space between the mold halves is sealed against communication with the shell or retainer outside of the mold part.

The gas with which the articles are to be inflated is supplied to this enclosed sealed space between the mold halves under pressure at which the articles are to be inflated so that the space within the mold cavities, and which contains the parts to be joined to form the article, is filled with the desired gas at the desired pressure. Thereupon the movable mold half is forced toward the opposite mold until their adjacent faces meet and seal the mold cavities, containing the mold halves, to form the completed article, this sealing, therefore, taking place while the article halves are inflated with the gas at the desired pressure. As the mold parts are forced together, all excess gas is expelled back through the supply pipe. The mold halves are then heated by steam, or other suitable means, until the parts are cured, whereupon the molds are cooled and opened, the gas supply pipe meanwhile having been closed. The mold retainers or shells may then be opened and the completed articles taken from the molds.

The mold retainers or shells are so mounted and formed that when opened they are swung to position to enable the article halves or parts to be readily placed in proper position in the mold sections and to be positively and accurately held in position for joining when the molds are closed. This is accomplished by inter-fitting beads and recesses on the article halves and mold receptacles, respectively.

To ensure a proper sealing and joining of the article halves during the above operations, one of the halves is provided with a beveled edge sloping inwardly to provide an acute outer edge. The other half is also beveled but in the opposite direction, but with such an angle that it intersects the beveled edge of the first part when the two parts or halves are forced together. In this manner it is forced more tightly against the beveled edge of its complementary part and forms a more positive, firmer seal therewith.

Referring more particularly to the apparatus illustrated in Figs. 1 to 4 of the accompanying drawings, a lower mold retainer or shell 10 is mounted in an inclined position on a pedestal or standard 11. A movable mold retainer or shell 12 is mounted and held in complementary position on the fixed retainer 10 by means of a bifurcated lever 13 secured by means of a pin 14 to bosses 15 on the upper outer face of the retainer or shell 12 and pivotally mounted at 16 on a bracket 17 extending upwardly and forwardly from the upper edge of the fixed mold or retainer or shell 10.

The opposite end of the lever 13 is connected by means of a piston rod 18 to a piston within a cylinder 19 pivotally secured at its lower end by means of a bracket 20 to the base of a pedestal 11, so that when the piston rod 18 is forced downwardly by pneumatic pressure, the retainer or shell 12 is lifted upwardly from the fixed shell or retainer 10. Means are also provided for swinging the shell or retainer 12 about the pin 14 so as to bring it to the position shown in broken lines in Fig. 1. This swinging may be accomplished by separate fluid operated or other means or, as shown in Fig. 1, it may be accomplished by means of a link 21 pivotally mounted at its upper end 22 to an extension 23 of the bracket 17, and at its opposite end connected by means of a pin 24 and slot 25 to a boss 26 on the upper surface of the shell or retainer 7.

As indicated in the drawings, the linkage between the link 21 and one arm of the lever 13 is such as to swing the mold shell or retainer to the position indicated in broken lines when the mold shell is lifted.

Within the fixed or lower shell or retainer is mounted a mold half or part 26, Figs. 3 and 4. The edge of this mold which, in the example shown, is of circular shape, fits the inner surface of the side wall 27 of the mold retainer or shell 10 and has an exposed surface spanning the area within the side walls 27 and provided with a number of semi-spherical recesses 28 of dimensions corresponding to the size of the balls to be formed.

The mold part 26 is slidably mounted in the retainer 10 so that it may slide downwardly therein until its lower wall 29 contacts with, and is stopped by, the bottom wall 30 of the retainer 10, this movement, however, being a relatively slight one. It may move outwardly of the retainer 10 until its front or exposed face contacts with a face of a complementary mold 31 in the upper retainer 12. The mold 31 may be, and preferably is, mounted in fixed position in the retainer 12. The outward movement of the mold 26 may also be restrained by a shoulder 32 on the inner edge or surface of the wall 27 which fits into a corresponding niche 33 in the mold part 26. The space between the rear walls 29 and 30 of the mold part 26 and retainer 10, respectively, is sealed from the front face of the mold in such a manner that fluids supplied under pressure to either of the above faces cannot escape to the other. This is preferably accomplished by a circumferential packing 34 set into a recess in the side wall 27 of the retainer shell 10. This packing may be pneumatically pressed toward the wall of the mold half 26 by fluid pressure supplied through a duct 35 to the channel surrounding the packing 34. A similar packing 36 is provided in the edge of the wall 27 that contacts with the corresponding circumferential wall 37 of the upper shell or retainer 12 so that when these two parts are brought together, a tight seal may be made between them.

When the apparatus is in open or charging position, as shown in dotted lines in Fig. 1, each recess 28 in the lower mold part 26 is filled with a hollow hemi-spherical half or section of rubber as indicated at 38 in Figs. 5 and 6. Corresponding or complementary hemi-spherical recesses 39 in the upper mold part 31 are, in this position of the machine, accessible to the operator and are similarly supplied with hollow hemi-spherical sections or halves 40. When all of the mold has thus been supplied with hemi-spherical parts, compressed air is released from the upper part of the cylinder 19, and the upper mold part and its retaining shell are permitted to swing or fall downwardly to the position shown in full lines in Fig. 1, the linkage between the lever arm 13 and link 21 being such as to swing the upper mold shell 12 about the pin 14 to its proper position to register with the lower mold and shell. During or prior to this movement, the mold half 26 will be resting on the lower wall 30 of the lower mold retainer or shell 10 so that the opposing faces of the mold halves 26 and 31 do not abut but are slightly spaced, as indicated in Fig. 6 of the drawings. The edges between the hemi-spherical halves 38 and 40 to be joined to the completed article are also slightly spaced, as shown in Fig. 6, giving access between the interior of these parts and the space between the opposing faces of the mold halves 26 and 31.

The two mold retainers or shells 10 and 12 are thereupon tightly locked in position on opposite sides by means of a pair of keys 41, one on each side, Figs. 1, 2 and 4, which slide in respective spaced lugs 42 and 43 on the lower mold half or shell 10 and in aligned recesses in a lug 44 on the upper mold shell or retainer 12.

As indicated in Fig. 4 and in dotted lines in Fig. 2, the keys 41 are recessed in the end part which, in closed position, extends into the lug 43 so that when a key is withdrawn this cut-out portion will not overlap the central lug 44, but will clear the latter and permit the upper retainer shell to be lifted from the lower one. The keys 41 are swung to locking and interlocking position by means of a pair of lever arms 45 mounted on a rock shaft 46 which is, in turn, rocked by an arm 47 connected at its lower end to a piston rod 48. The piston rod 48 extends into a pneumatically operated cylinder 49 and is connected therein to a piston so that it is moved to one position or the opposite by means of fluid under pressure admitted alternately to opposite ends of the cylinder 49 by branch pipes 50 and 51 under the control of an operator or of a suitable timing and operating mechanism.

When the mold shells have thus been locked in closed position, fluid under pressure is admitted through the duct 35 to the packings 34 and 36, causing the latter to tightly seal the edge walls of the lower mold part 26 and the abutting edges of the mold shells or retainers 10 and 12, respectively.

A supply of gas with which the articles are to be filled, and under the pressure at which they are to be filled, is then admitted through a supply pipe 52 to a duct 53 in the upper mold part 31 which leads to the space between these two mold parts. This space, as indicated at 54 in Fig. 6, and also the space within the two hemispherical halves 38 and 40, are thus filled with gas at the desired pressure. Thereupon the lower mold part 26 is forced against this pressure, upwardly into close contact with the upper mold part 31, bringing the two opposed faces of the molds tightly together and eliminating the space 54. The gas contained in this space is thereby forced back through the duct 53 into the supply pipe 52 so that there remains in the apparatus only the gas within the hemi-spherical halves 38 and 40. The mold half 26 may be forced upwardly by any suitable means as, for example, by fluid under greater pressure than that supplied through the pipe 52, and admitted through the inlet pipe 54, Fig. 4, between the wall 29 of the lower mold part 26 and the wall 30 of the retainer shell.

The articles are now completely assembled and inflated. Steam is then admitted to steam chambers 55 in the mold 13 through pipes 56 and 57 and is also admitted to steam chambers 58 in the movable mold 26 through pipe connections 59 and 60 which are threaded into the mold 26 and passed through suitable packings 61 and 62, respectively, in the wall 30 so that these pipe connections may move with the movement of the mold 26.

When the articles have been sufficiently cured, cooling water may be admitted to the steam chambers 55 and 58 through the respective pipe connections 56, 57, 59 and 60. Thereafter the pressure in the supply pipe 54 is released. The pipe 52 is disconnected from the source of gas and connected with air under pressure which thereupon forces the mold 26 away from the mold 31 and back to its original position. Then the pressure on the lines 11 and 12 is released.

Connections from the pressure fluid to the cylinder 49 are reversed, whereupon the lever 45, 46 is rotated to withdraw the key 41 and unlock the two mold retainers or shells 10 and 12. Fluid under pressure is then admitted to the upper part of the cylinder 19, pushing downwardly the piston and rod 18 and swinging the mold shell 12 to the position shown in broken lines in Fig. 1. The parts may be locked in this position by means of a safety catch 63 pivoted at 64 to the lower part of the bracket 17 and having notches 65 to engage a pin 66 on an arm of the lever 13.

The lever 13 is then held in position even though the pressure in the cylinder 19 should fail. The completely formed balls or other articles may then be removed from the exposed mold half and replaced with parts to be again assembled and cured in the molds. The safety catch 63 may be released before the mold is closed by means of an operating rod 66' which is secured to a depending arm 67 of the safety catch.

To ensure that the two halves 38 and 40 to be molded shall be in their proper position in the mold recesses, the former are provided with beads 68 and 69, respectively, slightly spaced from and parallel to the plane of the edges of these halves, and these beads fit into suitably positioned recesses 70 and 71, respectively, in the surfaces of the mold recesses. When the operator inserts the two halves to be molded into the mold recesses, therefore, the beads 68 and 69 fitting into the recesses 70 and 71, accurately position the halves and also serve to hold them in this position while the molds are being moved into closed position.

It will be understood that any suitable and satisfactory type of joint may be used between the two halves 38 and 40.

In the case of a spherical object or ball, the type of joint shown in Figs. 5, 6 and 7 is very desirable. In this joint the edge of one part 40 is beveled inwardly on an angle to the plane of the edge indicated at B. The edge of the other part is beveled in a complementary direction, but on a larger than complementary angle as at A. Inasmuch as the angle A is greater than the angle B, the beveled face 72 of this half will not reach and intersect the inner spherical surface of the part if it be made of the same width as the beveled edge 73 of the part 40. The edge between the beveled face 72 and the inner surface of the part 38 will, therefore, be blunted, as at 74, although this is not strictly necessary, and the edge 72 may extend further toward the inner surface of the sphere than indicated in Fig. 7. In any event, however, as the two parts are brought together, the edge 74 will strike the tapered surface 73 before the two parts are completely assembled and the tapering edge 72 will, therefore, be forced inwardly against a certain outward resistance. This causes the two edges 72 and 73 to be forced together with a positive sliding friction which presses them into the most intimate contact and with the least amount of cement to hold them together. The pressure within the two parts also acts to press the edges 72 and 73 together, as a certain component of this pressure acts normal to these two surfaces. The above joint is, therefore, especially suited for use in the apparatus.

What I claim is—

1. Molding apparatus for hollow articles which comprises a pair of separable mold retainers forming a fluid tight chamber when closed, a pair of complementary molds, one for each retainer, one of said molds being movable in its retainer to and from the other mold, and means to seal said movable mold to its retainer to prevent passage of gas to and from the space between the opposed mold surfaces and the interior of the mold retainers.

2. Molding apparatus for hollow articles which comprises a pair of separable mold retainers forming a fluid tight chamber when closed, a pair of complementary molds, one for each retainer, one of said molds being movable in its retainer to and from the other mold, means to seal said movable mold to its retainer to prevent passage of gas to and from the space between the opposed mold surfaces and the interior of the mold retainers, and means to admit gas to and from the space between the complementary surfaces of said molds.

3. Molding apparatus for hollow articles which comprises a pair of separable mold retainers forming a fluid tight chamber when closed, a pair of complementary molds, one for each retainer, one of said molds being movable in its retainer to and from the other mold, means to seal said movable mold to its retainer to prevent passage of gas to and from the space between the opposed mold surfaces and the interior of the mold retainers, means to admit gas to and from the space between the complementary surfaces of said molds, and means to admit gas to said mold retainer on the face of said movable mold opposite said complementary mold surface.

4. Molding apparatus for hollow articles which comprises a pair of separable mold retainers forming a fluid tight chamber when closed, a pair of complementary molds, one for each retainer, one of said molds being movable in its retainer to and from the other mold, means to seal said movable mold to its retainer to prevent passage of gas to and from the space between the opposed mold surfaces and the interior of the mold retainers, means to admit gas to and from the space between the complementary surfaces of said molds, means to admit gas to said mold retainer on the face of said movable mold opposite said complementary mold surface, and means to admit heating and cooling fluids to said molds.

5. Mold apparatus for hollow articles which comprises a pair of separable mold retainer shells forming a fluid tight chamber when closed, a pair of complementary mold halves, one in each of said retainer shells, one of said mold halves being movable in its retainer shell to contact with the face of its complementary mold half to form a completed mold and away therefrom to break said mold, and means sealing said movable mold half to the walls of said retainer shell over which it moves.

6. Mold apparatus for hollow articles which comprises a pair of separable mold retainer shells forming a fluid tight chamber when closed, a pair of complementary mold halves, one in each of said retainer shells, one of said mold halves being movable in its retainer shell to contact with the face of its complementary mold half to form a completed mold and away therefrom to break said mold, means sealing said movable mold half to the walls of said retainer shell over which it moves, and means to admit and to vent pressure fluid within the retainer shell of said movable mold half to move said movable mold half respectively to and from the opposite mold half.

7. Mold apparatus for hollow articles which comprises a pair of separable mold retainer shells forming a fluid tight chamber when closed, a pair of complementary mold halves, one in each of said retainer shells, one of said mold halves being movable in its retainer shell to contact with the face of its complementary mold half to form a completed mold and away therefrom to break said mold, means sealing said movable mold half to the walls of said retainer shell over which it moves, and means to admit gas under pressure independently to opposite faces of said movable mold half.

8. Mold apparatus for hollow articles which comprises a pair of separable mold retainer shells forming a fluid tight chamber when closed, a pair of complementary mold halves, one in each shell, one of said mold halves being movable in its retainer shell to contact with the face of its complementary mold half to form a completed mold and to move away therefrom to break said mold, means for sealing said mold half to its shell to prevent passage of gas from the space between the complementary mold halves and the interior of said retainer shells, means to bring said shells together to complete a mold, means to admit gas to the completed mold between the opposed faces of said mold halves, and means to move said mold halves independently toward and from each other.

9. Mold apparatus for hollow articles which comprises a pair of complementary mold halves having flat contacting faces and mold cavities formed therein, a pair of separable mold retainer shells, one for each of said mold halves, said mold shells when closed forming a closed chamber between the flat faces of said mold halves, means to admit fluid under pressure into said closed chamber, one of said mold halves being movable in its retainer shell to contact with the face of its complementary mold half to form a completed mold and to expel gas entrapped between said contacting faces, and means sealing said movable mold half to the walls of its retainer shell in a fluid tight seal.

10. Mold apparatus for hollow articles which comprises a pair of complementary mold halves having semi-spherical complementary mold cavities and having opposed faces contacting throughout about said mold cavities, a pair of separable mold retainer shells, one for each of said mold halves and forming when closed a fluid tight closed chamber between said opposed faces of said halves, one of said mold halves being movable in its retainer shell to contact with the face of its complementary mold half to expel gas from said faces, means to admit gas to and from the enclosed space between said mold faces, and means for forming a fluid tight seal between the periphery of the movable mold half and its retaining shell.

11. Apparatus for molding hollow articles which comprises a fixed lower mold member, a movable upper mold member, a lever fulcrumed at a fixed point relative to said lower mold member, one arm of said lever being secured to said upper mold member and a link pivoted at a fixed point relative to said lower mold member and connected to said upper mold member, the fixed point of said link and its connection to said upper mold member being spaced from the fixed fulcrum of said lever and the connection of said lever to said upper mold member, whereby said upper mold member is rotated upwardly as it is lifted by said lever.

12. Apparatus for molding hollow articles which comprises a fixed lower mold member, a movable upper mold member to fit said lower mold member and complete a mold, and means to lift said upper mold member and to rotate it upwardly, which comprises a lever fulcrumed to lift said upper mold member and a link pivotally fixed at one end in spaced relation to the fulcrum of said lever and connected at its other end to said mold member spaced from the connection of said lever thereto whereby said link rotates said upper mold member about its connection to said lever as said lever is tilted upwardly.

13. Apparatus for molding hollow articles which comprises a fixed lower mold member and a movable upper mold member cooperating therewith, a lever fulcrumed at a fixed point relative to said mold member and connected to said upper mold member and a link pivoted at a greater distance than said lever fulcrum from said fixed mold member and connected to said upper mold member at a point between the fulcrum of said lever and its connection to said upper mold member, whereby said link rotates said upper mold member as the latter is lifted by said lever.

14. The apparatus of claim 13, in which said link has a slotted connection to said upper mold member to permit a preliminary lifting of the latter before it is rotated.

15. The apparatus of claim 13 having a latch to retain said lever in lifting position.

16. The apparatus of claim 13 having power means for rotating said lever in a lifting direction.

CUYLER S. McCHESNEY.